(12) United States Patent
Masterman

(10) Patent No.: US 10,789,566 B1
(45) Date of Patent: Sep. 29, 2020

(54) CAPABILITY-BASED ACCELERATED FULFILLMENT OF PREVIOUSLY-ORDERED ITEM

(71) Applicant: AMAZON TECHNOLOGIES, INC., Reno, NV (US)

(72) Inventor: Michael Frederick Masterman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1653 days.

(21) Appl. No.: 14/575,427

(22) Filed: Dec. 18, 2014

(51) Int. Cl.
G06Q 10/06 (2012.01)
G06Q 10/08 (2012.01)

(52) U.S. Cl.
CPC .................................. G06Q 10/083 (2013.01)

(58) Field of Classification Search
USPC .......... 705/7.11, 7.12, 7.13, 7.22, 7.23, 7.25, 705/307, 26.1, 51; 382/101
See application file for complete search history.

(56) References Cited

U.S. PATENT DOCUMENTS

| | | | | |
|---|---|---|---|---|
| 9,047,607 B1* | 6/2015 | Curial | ..................... | G06Q 30/00 |
| 2006/0242269 A1* | 10/2006 | Gross | ...................... | G06F 21/10 |
| | | | | 709/219 |
| 2014/0214554 A1* | 7/2014 | Lang | ....................... | G06Q 30/02 |
| | | | | 705/14.69 |
| 2016/0004778 A1* | 1/2016 | Finder | .................... | G06Q 50/01 |
| | | | | 707/722 |
| 2016/0328789 A1* | 11/2016 | Grosz | ................... | G06F 3/1242 |

OTHER PUBLICATIONS

U.S. Appl. No. 13/532,574, filed Jun. 25, 2012, Stephen M. Curial, et al.
U.S. Appl. No. 14/133,519, filed Dec. 18, 2013, Salman Hamid Ali, et al.
"UPS My Choice—Features," United Parcel Service of America, Inc., http://www.ups.com/mychoice/features/, printed Sep. 4, 2014, 1 page.
"UPS My Choice—Home Delivery on Your Schedule," United Parcel Service of America, Inc., http://www.ups.com/mychoice/, printed Sep. 4, 2014, 1 page.

* cited by examiner

*Primary Examiner* — Akiba K Robinson
(74) *Attorney, Agent, or Firm* — Robert C. Kowert; Kowert, Hood, Munyon, Rankin & Goetzel, P.C.

(57) ABSTRACT

Identifying existing orders of non-subscribers that are eligible for subscription-based shipping program features, enrolling the non-subscriber, and instructing modification of the fulfillment of the existing order based on the enrollment is described. A non-subscriber places an order for an item and a fulfillment plan is generated for the order. A determination is made whether the order is eligible for subscription-based shipping based on various factors and if eligible, the non-subscriber may subsequently be notified in a message that if she/he were a subscriber, they would have had their item by now. Analysis associated with the determination may include analysis of various possible fulfillment options that provide various mixes of factors such as inventory location, shipping cost, and available time, for example. If the non-subscriber agrees to become a subscriber, she/he is enrolled as a subscriber and the fulfillment plan for the existing order may be accelerated.

20 Claims, 7 Drawing Sheets

US 10,789,566 B1

CAPABILITY-BASED ACCELERATED FULFILLMENT OF PREVIOUSLY-ORDERED ITEM

BACKGROUND

Manufacturers, retailers, wholesalers, distribution centers, and other distributors (which may collectively be referred to as distributors) of items (e.g., goods or services) typically maintain an inventory of various items that may be ordered by and shipped to clients or customers. This inventory may be maintained and processed at a materials handling facility or facilities such as distribution centers, cross-docking facilities, and order fulfillment centers.

Network-based distributors, such as retailers that ship items purchased via a network site to customers, compete with brick and mortar retailers that provide customers with immediate gratification by providing the items directly to the customer with no associated shipping costs. Some customers may refrain from purchasing items from a network-based retailer because of the length of time and the cost associated with shipping the item to the customer. Subscription-based shipping services may help offset the costs associated with shipping items by increasing the number of items that are purchased and/or shipped. To a customer, shipping may appear to be too expensive and/or take too long. It may be difficult to message a potential customer with a subscription-shipping offer at a time when the customer feels the need for subscription-shipping. The advantages of the upfront payment of a subscription-based shipping service may not always be apparent to a customer when the customer is only considering a single transaction.

Figure 1:
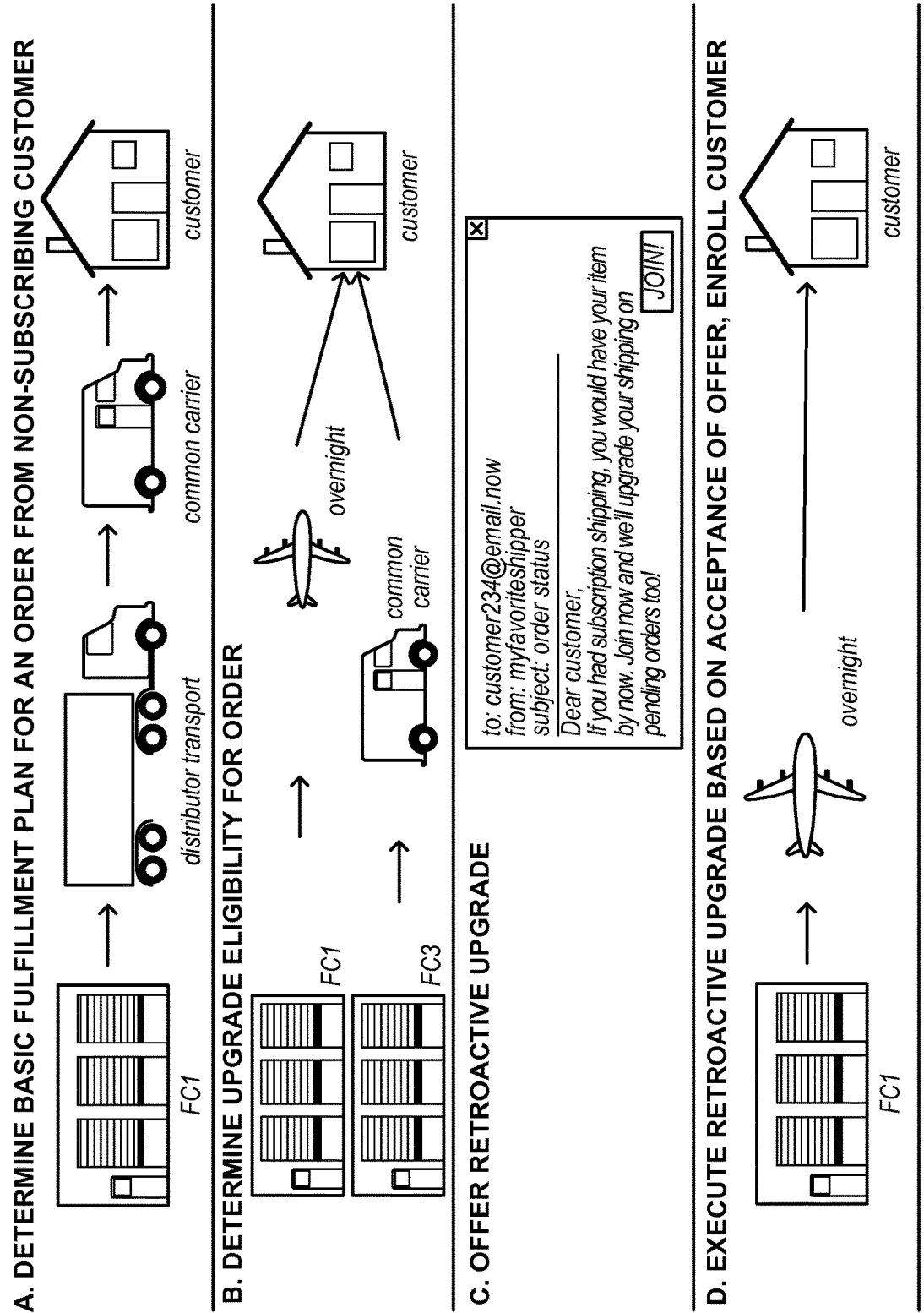
FIG. 1 illustrates a process for identifying an existing order of a non-subscriber that is eligible for subscription-based shipping program features, enrolling the non-subscriber, and modifying the fulfillment of the existing order based on the enrollment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of devices, systems and methods for identifying existing orders of non-subscribers that are eligible for subscription-based shipping program features, enrolling the non-subscriber, and modifying the fulfillment of the existing order based on the enrollment are described.

For example, a network-based site may offer items for sale and customers may order the items from the network-based site to be delivered, e.g., by a fulfillment network. In some embodiments, the network-based site or the fulfillment network may offer a subscription-based shipping program with various features, such as reduced-cost shipping, accelerated shipping, etc. Some customers may be subscribers to the subscription-based shipping program that pay for shipping at a discounted rate for each order or receive a higher service level, while other customers may not be subscribers to the subscription-based shipping program that instead pay for shipping at a full rate for each order or receive a different service level.

The system may determine which existing orders are associated with non-subscribing customers but are eligible for subscription-based shipping. For example, a fulfillment plan or fulfillment field in a database entry associated with an order may indicate that the order was (or was not) placed by a subscriber or that the order is (or is not) associated with subscription-based shipping. In some embodiments, particular items may be determined as eligible for subscription-based shipping (e.g., based on size, location, or inventory level or numerous other possible factors).

For existing orders that are both eligible and from non-subscribing customers, the system may determine whether it is possible to route the order to the customer in a time period that is less than the time period currently associated with fulfillment of the existing order. For example, if a non-subscribing customer selected 7 day shipping for the existing order, but 2 day shipping would be possible if the non-subscribing customer was a subscriber, the system may determine that it is possible to route the order to the customer in a shorter period of time than is currently planned.

The system may notify the customer that subscription-based shipping features such as accelerated shipping or free or otherwise reduced cost shipping is available for an existing order. For example, the system may notify the customer via SMS message, e-mail or via a network-based site that the customer is browsing, that accelerated shipping is available for the existing order. In embodiments, the notification may include an offer to upgrade to the accelerated shipping by becoming a subscriber to a subscription-based shipping program. In embodiments, the offer may be of limited time, for example, until the accelerated 2-day shipping is no longer faster than the 7 day shipping or until other fulfillment options are no longer available, or based on some other limitation associated with the subscription-based shipping feature, for example.

The system may receive an indication that the customer has accepted the offer, via responsive SMS, e-mail or via selection of an interface element of the network-based site, for example. Based on the indication, the system may initiate enrollment of the customer in the subscription-based shipping program and initiate fulfillment of the existing order in accordance with the features of the subscription-based shipping program. For example, the system may instruct fulfillment of the existing order in two days instead of the seven days originally planned.

In some embodiments, the system may perform a cost-benefit analysis (e.g., weighing the fulfillment costs and the benefits of enrollment of the non-subscribing customer) in order to determine whether to send the notification.

In some embodiments, the system may respond to enrollment of the customer by redirecting an in-flight order to an accelerated fulfillment route. In some embodiments, interface elements of the network-based site may be configured differently (or respond differently) for subscribers and non-subscribers. For example, subscription-based shipping features may be hidden from non-subscribers, in embodiments.

"In-flight" may be used herein to describe an order or item that has started the fulfillment process, but has not completed delivery. For example, an item that has been picked from inventory at a fulfillment center (a fulfillment center may be an example of a materials handling facility, in some embodiments) may be considered in-flight or an item that has been assigned to a particular order, but has not been picked from inventory may be considered in-flight. Items being packed for shipment or being transported from a fulfillment center may be considered in-flight, in embodiments. Items or orders that are at a fulfillment center of a common carrier or en route via some form of transportation provided by the common carrier may also be considered in-flight. In-flight may include items that are being returned from the customer. In various embodiments, items may be re-routed in-flight. The re-routing may be caused by execution of a modified fulfillment plan, in some embodiments. For example, the enterprise system (e.g., a group of systems comprising hardware, software or other physical systems that are operated on behalf of an enterprise) may communicate with the fulfillment facilities or the shipping carriers (e.g., common carriers) to instruct the item(s) or order for the item(s) (referred to interchangeably herein for the sake of brevity as the "order") to be re-routed in-flight such that the order are delivered according to a route defined by the modified shipping plan instead of the original or basic shipping plan. A carrier may redirect the in-flight order to an accelerated route based on the instruction. An order may be re-routed in-flight any number of times. In some embodiments, the characteristics of the item ordered may be changed in-flight. For example, the value of a gift card may be changed while the card is in-flight.

FIG. 1 illustrates a process for identifying existing orders of non-subscribers that are eligible for subscription-based shipping program features, and enrolling the non-subscriber, and modifying the fulfillment of the existing order based on the enrollment, according to some embodiments. In FIG. 1, a time-lapse process is illustrated that provides one example of a particular embodiment. At A, a basic shipping plan for an order from a non-subscribing customer is determined. The order may have been placed by a customer via an e-commerce website, for example. A illustrates that the basic fulfillment or shipping plan (referred to interchangeably herein for the sake of brevity as the "fulfillment plan") may include using distributor transportation to move the item from fulfillment center 1 to a common carrier that will deliver the item to the customer. In this illustrated embodiment, A illustrates a relatively inexpensive, but slower fulfillment plan as the distributor transportation is less expensive than other forms of transportation, such as overnight transportation by a common carrier, for example.

A fulfillment plan may describe a plan for fulfillment of the order, in embodiments. For example, the fulfillment plan may describe which particular unit is to be picked from what part of inventory. The fulfillment plan may include any or all of the processing elements that move the item from the inventory area through sortation, packing, and shipment. The fulfillment plan may include various levels of detail regarding a common carrier selected for shipping the order to the customer.

At B, the upgrade eligibility for the order is determined. For example, the system may determine whether there are other possible fulfillment scenarios or plans that would also get the order to the customer. In the illustration, there is an alternative to the basic fulfillment plan, where the item is sourced from the same fulfillment center FC1 (e.g., a particular fulfillment center of a fulfillment network), but is sent via overnight delivery (e.g., via air) to the customer. There is also another alternative illustrated where the item is sourced from a different fulfillment center FC3 (e.g., a particular fulfillment center of a fulfillment network) and sent via land-based common carrier to the customer. In the illustrated example, because there are other possible options to get the item to the customer that are faster than the basic fulfillment plan, the order is eligible for the upgrade. If no other options were available, the order would not be eligible for the upgrade, in embodiments. Other criteria may be used to determine eligibility, as described herein in various embodiments. Eligibility of items may be determined prior to the order being placed.

For eligible orders, the system may determine when the customer would have received the order if the customer was a subscriber and may send a notification to the customer at or near-to or subsequent to the time when the customer would have received the order. For example, at C, a notification is sent to the customer of the existing order offering a retroactive upgrade to the fulfillment for the existing order. In the illustrated example, a message from a shipper (myfavoriteshipper) to a customer (customer234) includes text describing to the customer that if the customer was a subscriber, the customer would have had their item by now. In the illustrated embodiment, the notification asks the customer to join a subscription-based shipping program and displays a selectable interface element that the customer may use to indicate agreement to join or a desire to learn more about the subscription-based shipping program. In some embodiments, the offer may be for a limited time. The limited time may be based on a window of opportunity for providing a feature of the subscription-based shipping program, such as accelerated shipping.

Part D of the illustrated embodiment illustrates that a retroactive upgrade has been executed based on the customer's acceptance of the subscription-based shipping offer (e.g., the fulfillment or a fulfillment plan has been updated or modified). In particular, the overnight option from Part B has been executed, although other plans, such as the common carrier plan from part B may also be executed, in embodiments. If no notification is received indicating acceptance of the offer, the order may be fulfilled according to the basic fulfillment plan determined in part A, described above.

The process illustrated in FIG. 1 may be altered (as described in numerous embodiments herein) and may be performed in accordance with the processes illustrated in FIGS. 4 and 5 and described below. The process illustrated in FIG. 1 may be performed by various modules, components and systems such as illustrated in FIGS. 2, 3, 6 and 7, also described below.

Figure 2:
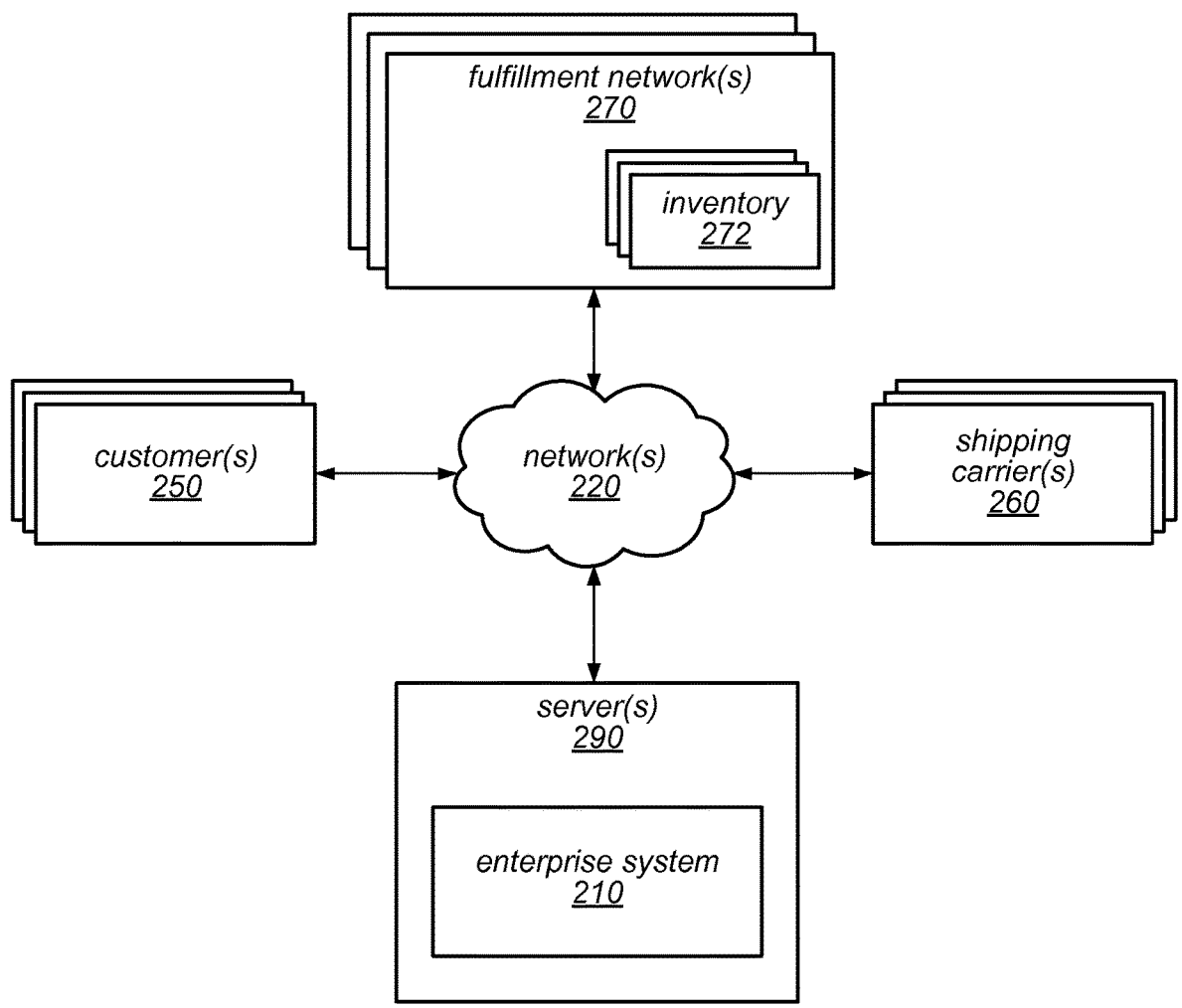
FIG. 2 is a block diagram of a system for identifying an existing order of a non-subscriber that is eligible for subscription-based shipping program features, enrolling the non-subscriber, and modifying the fulfillment of the existing order based on the enrollment, according to some embodiments.

FIG. 2 is a block diagram of a system for identifying existing orders of non-subscribers that are eligible for subscription-based shipping program features, enrolling the non-subscriber, and modifying the fulfillment of the existing order based on the enrollment, according to some embodiments.

FIG. 2 illustrates an example environment where enterprise system 210, implemented on various server(s) 290 interacts with customer(s) 250, fulfillment network(s) 270 (e.g., a network or networks of entities that perform activities such as handling and executing customer orders) with inventory 272 and shipping carrier(s) 260. The illustrated systems and networks may be arranged differently in different embodiments, for example, one or more of the fulfillment network(s) 270 or one of the shipping carrier(s) may implement one or more of the modules or systems illustrated in the enterprise system 210 in FIG. 3, in some embodiments. The interaction among the illustrated elements may be performed via any of various channels, such as programmatic API, network pages, or batch processing and the like.

In the illustrated embodiment, customer(s) may interact with any of the enterprise system component(s), fulfillment network(s) or shipping carrier(s) and in an example embodiment, the customer(s) 250 interact with enterprise system 210 to place orders for items that are fulfilled via the fulfillment network(s) 270. The fulfillment network(s) may rely upon shipping carrier(s) 260 for part of the delivery of the items ordered by the customers. In various embodiments, various entities may own or control different portions of the illustrated systems. For example, one entity may own or control both the enterprise system 210 as well as one or all of the fulfillment network(s) 270. In another example, each of the enterprise system 210, fulfillment network(s) and shipping carrier(s) may all be owned or controlled by different entities.

Portions of enterprise system 210 may be implemented on one or more server(s) 290, one or more of which may be coupled to network(s) 220 (or another network, or combination of networks). Servers 290 may include software that implements enterprise system 210 through which the functionalities of the modules, components and systems illustrated in FIG. 3 may be supported. In embodiments, the enterprise system may perform identification of existing orders of non-subscribers that are eligible for subscription-based shipping program features, enrollment of the non-subscriber and modification of the fulfillment of the existing order based on the enrollment, as described herein. Enterprise system 210 may include software implemented by hardware and/or hardware that implements a subscription-based shipping program enrollment system 310 that provides some the functionalities described herein. The subscription-based shipping program enrollment system 310 may be a part of enterprise system 210 and may interact with various other components in enterprise system 210.

Embodiments may be implemented in various types of logic, such as a virtual marketplace, or any network-based site that provides other entities, such as merchants, manufacturers, retailers, and distributers with opportunities to offer items for order on the network-based site. Enterprise system 210 may be controlled by a single entity or single group of entities. This same entity or group of entities may also control a fulfillment network which offers items on the network-based site. Communications between the network-based site and the fulfillment network may operate through public communication channels, such as a public network like the Internet, or private communication channels, such as a mutually accessible inventory management system. The enterprise system 210 may communicate orders to the fulfillment network and receive information concerning offered items from the fulfillment network, such as the item quantity, shipping origin, or identification numbers.

The enterprise system (e.g., when implementing a network-based site) may obtain requests from customers. Network-based site 385, implemented on servers 290 may be configured to obtain requests from customers 250. Customer requests, such as requests for display information concerning a particular item offered on the network-based site may travel over a network, such as the network(s) 220. In some embodiments, servers 290 may receive requests from customers 250 through a client system (e.g., a computing device such as a desktop computer, laptop computer, tablet computer, smart phone, etc.). Each client system of one of customers 250 may be configured to access the network-based site using, for example, a client application, such as a browser. Network-based sites may utilize other messaging protocols or networks for messages received from client devices. For example, in some embodiments, a server 290 may be configured to receive a SMS or MMS text message requesting display information from a mobile phone of one of customers 250. In other example embodiments, servers 290 may obtain request messages from a supply management system of a customer 250 that utilizes a server system that sends request messages over a private network. Various embodiments may configure servers 290 to obtain customer(s) 250 requests from many different devices using many different communication protocols. For example, a network-based site may provide customer(s) 250 with an Application Programming Interface (API) through which a client system may be configured to communicate with API defined message formats and functionalities to servers 290 and enterprise system 210.

In one embodiment, servers 290 may allow a customer 250 using a client system access to a network-based site 385 implemented by enterprise system 210 on servers 290, for example, using a browser. The network-based site may cause a network page of the network-based site to display on the client system, which network page may include a user interface configured to specify one or more items for display for the customer, and a user interface configured to accept user orders of displayed items. Display information configured and sent by a network-based site to one of customer(s) 250 may be configured to display information concerning the specified one or more items on the user interface. Information about an enhanced shipping option (reference may be made to an enhanced shipping option or an enhanced fulfillment option herein) or a subscription-based shipping program and/or one or more user interface elements for selecting shipping options may be displayed on the user interface. In some embodiments, the interface elements are selectively displayed based on whether the customer is a subscriber.

A network-based site 385 may send orders to a fulfillment network and receive from a fulfillment network requests to submit additional items for offer on a network-based site. Many different hardware and software configurations may be implemented to facilitate these communications. For example, servers 290 may send orders and obtain requests from one or more other fulfillment networks 270 over a network, such as the network(s) 220, through a client system (e.g., server, a computing device such as a desktop computer, laptop computer, tablet computer, smart phone, etc.). These fulfillment networks may be controlled by an entity distinct from the entity controlling the network-based site. In some embodiments, server(s) 290 may allow a client system of another fulfillment network (e.g., one of 270) to access the network-based site using a client application, such as a browser. The enterprise system may send orders to other fulfillment network (e.g., others of 270) by displaying information through the client application.

A network-based site 385 may control or operate its own fulfillment network for items it offers on the network-based site. In some embodiments the network-based site 385 may generate orders and send the orders to an entity fulfillment network controlled by the same entity controlling the network-based site. Orders may be communicated through a variety of means, such as over an internal network (e.g., intranet). In some embodiments, enterprise system 210 and an enterprise fulfillment network may both access an inventory management system through which enterprise system 210 may send orders to the enterprise fulfillment network and obtain item information from enterprise fulfillment network.

In some embodiments, the enterprise system may communicate with shipping carriers to determine item eligibility for an enhanced shipping option. For example, servers 290 implementing enterprise system 210 may request or obtain information from one or more shipping carriers 260 over a network, through a server or other computing device. Shipping carriers may be courier services, package delivery services, postal services, freight services, and more generally, any common carrier, service, company, or mode of transporting an item from one location to another. Enterprise system 210 may be configured to submit information to shipping carriers 260, such as shipping origin, shipping destination, and shipping timeframe information. In some embodiments, servers 290 and client devices of shipping carrier 260 may both access a mutual data store or other storage device that allows either party to store and retrieve information for the other party. Other communication tools may be used, such as an API. For example, a network-based site may obtain an API from shipping carriers 260 allowing enterprise system 210 to communicate with one or more client devices of shipping carriers 260, such as servers, through an application. This application may be able to provide the network-based site with information used by a location-based shipping component to determine item eligibility for an enhanced shipping option. For example, a location-based shipping component may send a postal code and a one day shipping timeframe to shipping carriers 260 utilizing the API. The location-based shipping component may receive from shipping carriers 260 information or data containing a list of postal codes which the shipping carrier may deliver from the origin postal code within the one day shipping timeframe in addition to the shipping cost.

Users, often described as customers, of a network-based site may peruse items offered on by an enterprise (e.g., via a network-based site 385) through a variety of systems, and communication methods, such as communications exchanged over a network. Customers, more generally, may be retailers, merchants, individuals, suppliers, and/or any other entity that may request display information concerning items offered on a network-based site. Customers may be other network-based sites or enterprises with supply channels or networks, utilizing many different hardware and/or software configurations to communicate with a network-based site. For example, a custom car repair service may maintain a part supply system that communicates with a network-based site to request information on and place orders for specialty car parts offered on a network-based site.

The items offered on a network-based site may be fulfilled by other entities, such as fulfillment networks. Note that in some embodiments a fulfillment network may not be the owner of offered items. For example, a gardening retailer may offer several different species and varieties of plants for sale on a network-based site. When the gardening retailer receives an order for a particular warm-weather plant, it may direct a particular warm-weather nursery that holds the plant in inventory to ship the plant to a customer. The gardening retailer may own the plant and receive the profits from the plant's sale, but the warm-weather nursery may be the gardening retailer's fulfillment network because it receives the order for the warm-weather plant from the gardening retailer, retrieves the plant from inventory, and ships the plant to the customer.

One or more fulfillment networks may offer and/or fulfill the items offered on a network-based site. One or more of these fulfillment networks may be controlled by the same entity that controls the network-based site, or by a different entity, in embodiments. Some network-based sites may allow at least one other fulfillment network to offer items on the network-based site that are controlled by an entity distinct from the entity controlling the network-based site. For example, items may be offered on the network-based site 385 by one or more of the fulfillment network(s) 270, which accesses inventory 272, for example. The fulfillment network(s) may be operated or controlled by one or more entities distinct from the entity controlling the network-based site 385 and the entity fulfillment network of the fulfillment network(s) 270. In one example a jewelry artisan, neither owned nor controlled by the network-based site 385 may offer several different necklaces for order on network-based site 385. If the network-based site receives a customer order for one of the jewelry artisan's necklaces, then the network-based site 385 may communicate this order to the fulfillment network of the jewelry artisan. The jewelry artisan then packages and ships the necklace to the customer and retains the profits of the sale (though in some embodiments a network-based site 385 may share a portion of the profits, usually in the form of a fee). A network-based site, like 385, may offer items from multiple fulfillment networks. Communication between the network-based site 385 and the fulfillment network(s) 270 is depicted using network(s) 220 (e.g., private communication channels, including, but not limited to private networks utilizing hardware devices or software implemented by hardware devices, shared access to inventory management systems, or private communications such as emails, Multimedia Messaging Service (MMS) or Short Messaging Service (SMS) text messages, phone calls, facsimiles, or other physical or digital communications). As depicted, fulfillment network(s) 270 may utilize public communication channels (e.g., network(s) 220) such as networks like the Internet.

Communications between a fulfillment network and an enterprise (e.g., enterprise system 210) may be facilitated through many different communication systems, implemented by many different configurations of hardware and software. Some enterprises may communicate through private networks or channels to direct orders to fulfillment networks, while others may use public communication channels, such as a network like the Internet or wireless networks, to send communications to and receive communications from fulfillment networks. The content of these communications may be orders for items directed to fulfillment networks and the reminders, directions, and follow-on communications related to an order. Communications may also include information concerning items a fulfillment network offers on the network-based site, such as the item identification numbers, quantity of items, and the logistical information necessary to ship items, such as the shipping origin of the item where a shipping carrier would take custody of the item. Some embodiments may allow a network-based site to receive communication information for new or additional items to be offered on a network-based site from fulfillment networks.

Servers 290 may be coupled to data storage (not illustrated) for storing information in a database (e.g., network pages, data related to items offered by the network-based site, and customer information, such as, but not limited to, orders, customer billing information and default shipping addresses). Data storage may be implemented as one or more storage devices configured independently or as a storage system. In general, data storage may be implemented as one or more of any type of storage device and/or storage system suitable for storing data used by the server systems of the network site including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof.

A database may be implemented as a single, monolithic database or as a combination of two or more databases and/or data stored in other, non-database formats, such as files stored in any of various file formats. A database may be or may include a relational database, or may be or may include any other type of database, such as an object oriented database, depending on implementation, or combinations thereof. In one embodiment, a database may include a customer database configured for storing information about customers that have accounts for accessing the network site. In one embodiment, a database may include a user database for storing information about users that have accounts at the network-based site. The stored user information may include, but is not limited to payment and billing information, a default shipping address, order history, and memberships with network-based site programs, such as a subscription-based shipping program. Other data stored in a database may include fulfillment network performance data, such as on-time delivery data and customer feedback. Databases may store the shipping origins for items offered for order on the network-based site, quantities of offered items, and item identification numbers. Shipping performance information may be stored regarding one or more shipping carriers providing delivery times and locations for previous orders. Embodiments may record orders generated by the network-based site in a database, including shipping information such as shipping labels and shipping tracking identifiers. More generally, data storage may store some or all transactional data received by and sent from a network-based site to customers 250, fulfillment network(s) 270, shipping carriers 260, and/or an enterprise fulfillment network (e.g., one of the illustrated fulfillment network(s) owned or controlled by the same entity the owns or controls the enterprise).

Figure 3:
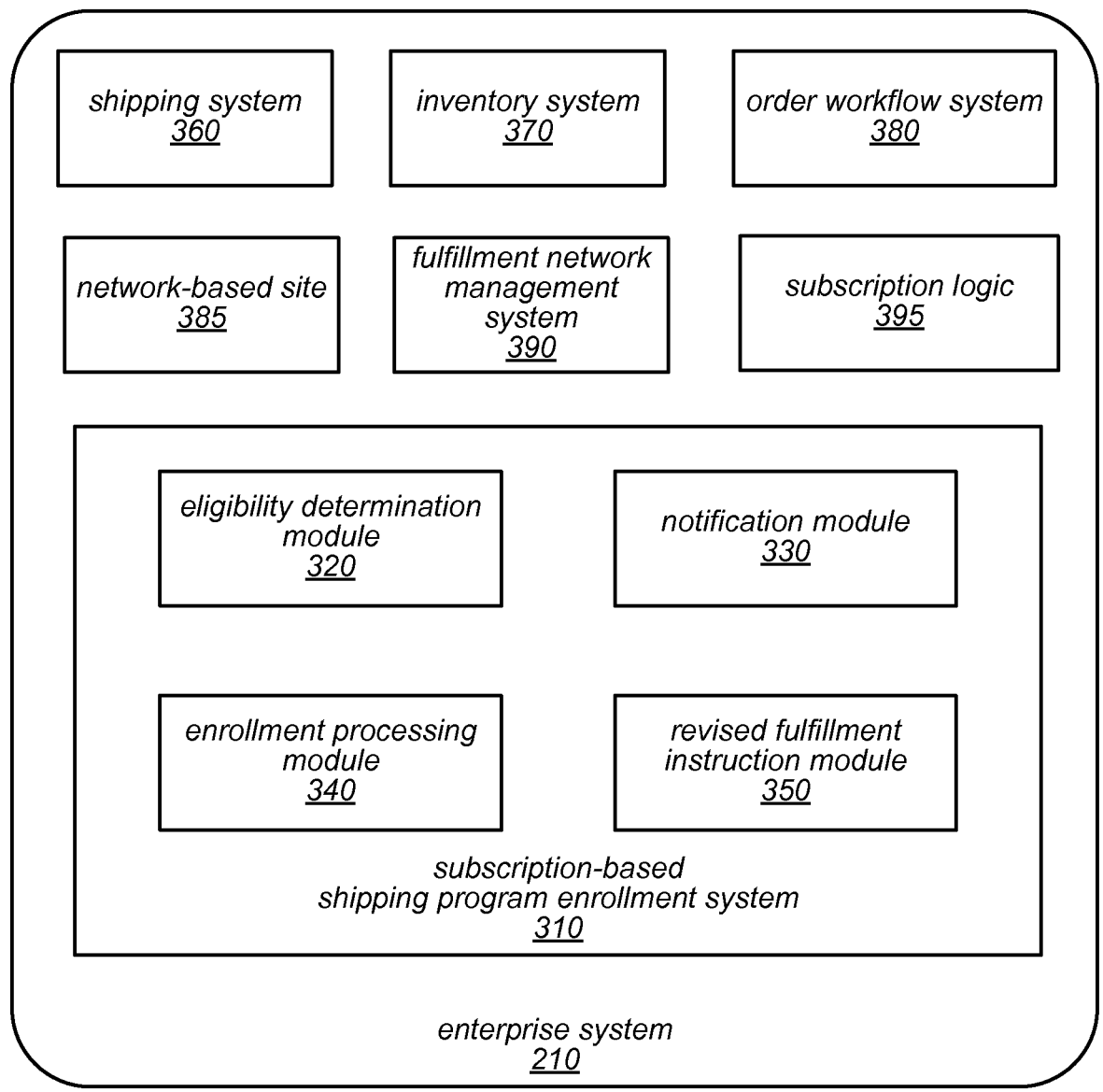
FIG. 3 is a block diagram of an enterprise system illustrating various systems that interact with a subscription-based shipping program enrollment system, according to some embodiments.

FIG. 3 is a block diagram of an enterprise system illustrating various systems that interact with a subscription-based shipping program enrollment system 310, according to some embodiments. Several of the modules, components and/or systems illustrated may be arranged otherwise. Furthermore additional or fewer modules, components and/or systems may be part of the system, in embodiments. For example, even though the modules are illustrated as part of the subscription-based shipping program enrollment system 310, those modules may be configured or arranged as parts of other system and/or components. In another example, the systems, site, logic illustrated outside of the subscription-based shipping program enrollment system 310 may be arranged as part of the subscription-based shipping program enrollment system 310 or not part of enterprise system 210 at all. For example, any individual one of the modules, components and/or systems may be configured as a third party service, provided by another enterprise, or otherwise.

In the illustrated embodiment, enterprise system 210 is illustrated with shipping system 360. Shipping system 360 may include data and logic associated with various transportation and delivery systems (e.g., transportation and delivery system associated with the enterprise). For example, shipping system 360 may store data associated with delivery and transportation resources that are available as part of the enterprise fulfillment network and/or other non-enterprise fulfillment network(s). Shipping system 360 may be able to provide the transportation and delivery options that are available for fulfillment of orders based on performing analysis of the stored data in response to requests, in embodiments. The delivery options may be provided with respect to a particular time-slot or other time-related condition or with respect to particular locations, in embodiments.

Inventory system 370 may provide data regarding the inventory of various sources such as the materials handling facilities of the fulfillment network(s) 270, in embodiments. In some embodiments, the inventory system 370 may provide data associated with inventory levels of fulfillment centers of the enterprise. In some embodiments, the inventory system may provide data associated with the inventory levels of fulfillment centers other than those of the enterprise (e.g., third party fulfillment networks). Examples of the information may include actual inventory information as well as expected incoming deliveries to the materials handling facilities, deliveries being processed and inventory being sent out, in embodiments.

In embodiments, interaction with the shipping system 360 and/or the inventory system 370 (e.g., by the eligibility determination module 320) may be used to determine that the item may be transshipped to another fulfillment center or carrier distribution center to reduce the cost for shipping.

Order workflow system 380 may provide data regarding the status of the workflow associated with an order or the items of the order. For example, whether the item has been back-ordered, whether the item has been picked from inventory, whether the item has been sorted, whether the item has been packed, whether the item has been shipped, or whether the item has been returned. In some embodiments, the order workflow system 380 may track the order throughout the fulfillment process until the item is delivered to the customer or returned. In some embodiments, the order workflow system 380 may be queried to determine where an order is such that the order may be redirected (e.g., at a pack station or at a hub of a common carrier) or the order processing canceled (e.g., on a long-haul truck), for example, by fulfillment network management system 390.

FIG. 3 depicts a network-based site 385. Embodiments of a network-based site may send display information to a user for one or more items that may be selected for order in response to a user request to a network-based site. Some embodiments may allow users of network-based sites to order items offered by the network-based site with an enhanced shipping option. Users may order items offered by one or more fulfillment networks. Display information sent to a user may provide a user interface configured to accept a user order for a particular item. A user interface may display one or more user interface elements configured to select a shipping option for a particular item. Embodiments may generate an order for the selected one or more items. An order may contain shipping information for a particular shipping carrier, such as a shipping label and/or shipping tracking identifier. The order may be sent to the corresponding fulfillment network. Various embodiments may record an order in a database.

In at least some embodiments, a user may be a subscriber of a subscription-based shipping program. A subscription-based shipping program may be offered by a network-based site providing subscribers with a plurality of shipping options for items ordered at the network-based site. In some embodiments, the enhanced shipping option is one of many shipping options available to subscribers of a subscription-based shipping program. For subscribers, some embodiments may determine whether items offered by fulfillment networks controlled by an entity distinct from the entity controlling the network-based site are eligible for the subscription-based shipping program.

Some embodiments may provide a fulfillment network access to a user interface. A user interface may contain various user interface elements which display orders sent to the fulfillment network. Embodiments may allow a fulfillment network to retrieve shipping information for an order, such as shipping labels and/or shipping tracking identifiers.

The user interface may display submission user interface elements configured to obtain information concerning an item, such as the identifier of an item, the quantity of an item, and the location of an item.

Embodiments may be implemented in various network-based sites, such as a virtual marketplace or network sites that support e-commerce. These network-based sites may provide other entities, such as merchants, manufacturers, retailers, and distributers with opportunities to offer items for order on the network-based site. A network-based sited may offer an enhanced shipping option to users that specifies certain shipping services for an item ordered with the enhanced shipping option. An enhanced shipping option may be a location-based shipping option, dependent on the shipping origin of an offered item and the predicted shipping destination of a user who may order the item. An enhanced shipping option may be a shipping option that can be used based on the cost of shipping from the location of the shipping origin and predicted shipping destination. Offered services for an enhanced shipping option include, but are not limited to, free and/or reduced-rate shipping for eligible items ordered on the network-based site. Enhanced shipping may include white glove service, alternative forms of items (e.g., electronic), alternative versions of items, early access to items, in embodiments.

An enhanced shipping option may also be a component of a subscription-based shipping program offered by a network-based site. A subscription-based shipping program, more generally, may provide mechanisms that allow users of network-based sites to pay a fee to obtain a subscription or membership in a shipping program offered to customers of the network-based site for a period (e.g., a month, six months, a year, etc.) that provides the users with free and/or reduced-rate shipping for at least some items ordered from the network-based site during the period covered by the subscription. In embodiments, in paying for a subscription to the program, a user may essentially be pre-paying a fixed shipping charge for a period (a month, six months, a year, etc.) instead of paying a per-order shipping charge based upon the number of items ordered, the size and/or weight of the items, or other factors. Instead of users paying per-unit charges for every order for shipping, embodiments may provide a subscription-based shipping program with a fixed subscription, and thus shipping, cost for the subscriber.

In embodiments, an enhanced fulfillment option (e.g., an enhanced shipping option) may indicate or be associated with other features, some of which may not affect the physical delivery of the order. For example, enhanced shipping may include other upgrades such as access to another version (e.g., an electronic version) of the ordered item (e.g., content) and/or earlier access to the ordered item (e.g., an instant streaming video version or a downloadable version of a physical DVD or CD that was ordered). In embodiments, the other features of enhanced shipping may be tied to the ordered item. Other features, such as these and others may be made part of the offer to join as subscriber and/or may be provided as a benefit of being a subscriber (e.g., that are not available to non-subscribers).

In embodiments, a shipping plan may be modified into a modified shipping plan. The shipping plan may be modified to include the above-noted other features such as the access to another version and/or earlier access and the like.

A subscription-based shipping program may, in some embodiments, allow any user of the network-based site to pay an annual membership fee to receive benefits including, but not limited to: free 2-day shipping on ordered items, or free standard shipping if 2-day shipping is not available for an item; next-day shipping on ordered items at a reduced cost per item; shipping either to the subscriber's address or to third-party addresses; and the ability to share the membership at no additional charge with one or more other users, such as residents of the same household (there may be an upper limit on the number or relationships of other customers that the membership may be shared with).

Note that the above is an example of subscription-based shipping program and is not intended to be limiting; other implementations may be set up differently. For example, other implementations may provide only one discounted or free shipping method for subscribers to the program (e.g., free 2-day shipping), or more than two discounted and/or free shipping options for subscribers the program. As another example, implementations may issue subscriptions to the program for different periods or using other models; for example, implementations may offer one or more of monthly subscriptions, bi-annual subscriptions, annual subscriptions, and lifetime memberships. Some implementations may offer various combinations, such as monthly subscription for the first year, and then annual subscription thereafter. Some implementations may offer tiered subscriptions, wherein users may opt to subscribe for different periods for different fees; for example, an enterprise may offer one month, six month, annual, and lifetime memberships or subscriptions to the shipping program for different subscription fees. In general, various implementations may offer subscriptions or memberships in the program of any arbitrary duration and not strictly of regular durations. Also note that embodiments may offer other benefits to the subscriber(s), for example exclusive and/or first access to special items or special offers, and/or special "fast track" handling of the subscribed user's orders.

Note that, while the term "order" is generally used herein in terms of a user purchasing an item from an network-based site, an "order" as used herein may also refer to a rental, a lease, an exchange, or any other transaction that might occasion a shipment of one or more items to or on behalf of users using an enhanced shipping option.

Network-based site 385 may obtain requests for display information for items offered on the network-based site from customers, such as customers 250. In some embodiments, network-based site 385 may be an e-commerce website or other computer network-based retail site. Network-based site 385 may receive requests from customers for display information concerning one or more items offered on the network-based site. In some embodiments the network-based site may receive these requests over a network, such as the depicted network(s) 220 (e.g., the Internet or a private network). The requested display information may be text, images, graphics or otherwise displayable data about a particular item. For example, one of customers 250 may have a desktop computer that displays a network page based upon display information received over the network(s) 220 from the network-based site 385. When the network-based site 385 receives the request from the customer, the network-based site 385 may send display information that displays various text and images concerning the item on the network page. A network-based site 385 may obtain requests from various customers, sending display information in response. A network-based site may obtain requests from customers for the same or different items offered on the network-based site. A network-based site, such as network-based site 385, may implement various configurations of servers, load balancers, and other hardware/software configurations to handle multiple customers.

FIG. 3 is illustrated with fulfillment network management system 390. Some fulfillment networks may be operated or controlled by one or more entities. Moreover, some fulfillment networks may be controlled by entities distinct from an entity controlling the network-based site. For example, a "brick and mortar" store may offer for order certain items, such as action figures, it currently carries in its physical store inventory on a network-based site that it does not own or control. Some of these distinctly controlled fulfillment networks may fulfill items that are eligible for an enhanced shipping option offered by the network-based site. Embodiments may obtain a request from a fulfillment network to submit additional items for offer on a network-based site for an enhanced shipping option.

Fulfillment network management system 390 is illustrated as part of enterprise system 210 and may manage fulfillment operations for fulfilling orders received from a plurality of customers. In some embodiments, the fulfillment network management system 390 may interact with the other elements of the enterprise system to instruct fulfillment of the order according to the fulfillment plan. In some embodiments, the fulfillment network management system 390 may modify the fulfillment plan for the existing order to fulfill the existing order taking into account the enhanced shipping option.

Subscription logic 395 is illustrated as part of enterprise system 210. In embodiments, subscription logic 395 may include logic for running the subscription-based shipping program, for example, enrolling subscribers, and implementing the features, benefits and restrictions associated with the subscription-bases shipping program. The subscription logic 395 may receive instructions to enroll the new subscriber from enrollment processing module 340.

Subscription-based shipping program enrollment system 310 is illustrated as part of enterprise system 210 and may include one or more modules configured to implement functionality associated with interacting with the shipping systems described above to facilitate enrollment of customers in the subscription-based shipping program. In various embodiments, the modules of the subscription-based shipping program enrollment system 310 may interact with one another and/or with the other systems depicted in order to carry out the functionality disclosed herein.

For example, eligibility determination module 320 is illustrated as part of subscription-based shipping program enrollment system 310 and may determine whether orders are eligible for an enhanced shipping option in accordance with the subscription-based shipping program. The eligibility determination module may perform all or some of the processes illustrated in FIG. 5, described below, in embodiments. In embodiments, eligibility determination module 320 may interact with the shipping system 360, inventory system 370, order workflow system 380, network-based site 385, fulfillment network management system 390 and/or subscription logic 395 to determine eligibility. For example eligibility determination module 320 may interact with the shipping system 360 to determine what fulfillment routes are possible and with inventory system 370 to determine where particular units of the ordered items are located. The order workflow system may be queried to find out where the items of the order are (e.g., at pack? at ship?) The network-based site may query the eligibility determination module 320 to determine whether to advertise that an order is eligible. The fulfillment network management system 390 may be queried to provide fulfillment plans and the subscription logic 395 may be queried to determine what features of the subscription-based shipping program are associated with which customers.

Embodiments may determine whether the item is eligible for an enhanced shipping option based upon the shipping origin of the item and a predicted shipping destination for the item. In some embodiments, this determination may be based on whether the item can be shipped by a shipping entity from the shipping origin to arrive at the predicted shipping destination within a timeframe for the enhanced shipping option using a cost-effective shipping technique. A cost-effective shipping technique may be a shipping technique such as ground shipping that may be a lower cost shipping technique than other shipping techniques, such as air shipping, that can ship the item from the origin to predicted destination within the timeframe for the enhanced shipping option. In some embodiments, a cost-effective shipping technique may be a shipping technique having a shipping cost below a predefined threshold. Display information sent to the user may be configured to indicate whether a particular item is eligible for the enhanced shipping option, in embodiments. Eligibility determination may be performed before one of the items is selected by a user in an order, in embodiments.

Eligibility for the enhanced shipping option may be determined, in various embodiments, according to a particular item's shipping origin and the user's predicted shipping destination. Embodiments may determine a particular item's shipping origin by accessing a database that contains the particular item's information, such as the shipping origin. Determining a user's predicted shipping destination may implemented in various ways. In some embodiments, user information accessible from a database may provide a default shipping or billing address. Embodiments may also identify the internet protocol (IP) address of the user request and perform a geolocation technique on the IP address to determine a location for the predicted shipping destination. Users may supply a shipping destination, which may be used as the predicted shipping destination.

Embodiments may determine eligibility for an enhanced shipping option by determining one or more shipping timeframes, according to the shipping origin and the predicted shipping destination. Timeframes may be determined by supplying the shipping origin and predicted shipping destination to one or more shipping carriers who return a shipping timeframe based upon the submitted information. Some embodiments may access shipping performance data and calculate a shipping time frame based on the shipping origin and the predicted shipping destination using the shipping performance data. Embodiments may obtain, from a shipping carrier, delivery destinations, such as a list of postal codes, according to a shipping origin and a specified delivery timeframe and determine whether the predicted shipping destination is one of the obtained delivery destinations in order to determine whether a particular item is eligible for an enhanced shipping option. In some embodiments, the shipping carrier may indicate a delivery area in which items can be shipped from the origin within the specified delivery timeframe using a cost-effective shipping technique. A cost-effective shipping technique may be a shipping technique such as ground shipping that may be a lower cost shipping technique than other shipping techniques, such as air shipping, that can ship the item from the origin to a destination within the delivery area within the timeframe for the enhanced shipping option. In some embodiments, the shipping carrier may provide the shipping cost of shipping an item according to the timeframe which may be compared to a predefined threshold for shipping the item with the enhanced shipping option.

Some embodiments may use the shipping tracking identifier to determine a delivery time for an item. If the delivery time exceeds a specified delivery timeframe, some embodiments may perform a corrective action. A corrective action may be sending an order fulfillment reminder to a fulfillment network, or sending a cancellation order for the item to the fulfillment network and sending the order to another fulfillment network or sending another unit of the item (e.g., from another fulfillment center). Some embodiments may determine whether the fulfillment network is eligible for the enhanced shipping option.

In some embodiments, the status of units of the item within a fulfillment center may be used in the determination. For example, if units of the item are in the receiving area of a fulfillment center, but have not been placed into inventory and thus are unavailable for picking, the item may be marked for cross-dock, such that a cross-dock operation could be performed on a unit of the item as part of the fulfillment plan.

In other embodiments, the possibility of executing a postal injection, where a fulfillment channel delivers the item to a carrier hub, instead of waiting for the carrier to pick up the item from the fulfillment channel may be considered as part of the determination.

The previous example illustrates various combinations of eligibility for items offered on a network-based site for various pairings of customers and fulfillment networks. An eligibility determination module may determine eligibility for offered items in response to various communications from both customers and fulfillment networks. These communications may provide further information obtained by the enterprise to determine or determine again item eligibility for an enhanced shipping option.

Subscription-based shipping program enrollment system 310 is illustrated with notification module 330. The notification module 330 may instruct or otherwise initiate a notification to be sent to the customer (e.g., notifications 612, 614, and 616 illustrated in FIG. 6 and described, below). In embodiments, the notification may include an offer to join as a subscriber or may provide information about the subscription program, such as features, time limits and the like. In embodiments, the notification module 330 may interact with the network-based site 385 (e.g., to instruct the notification) or with a proprietary communication system of the enterprise that is designed to manage communications with the customers (e.g., preferred forms of contact, contact information, etc.). Third-party communication channels and/or networks may also be used.

Subscription-based shipping program enrollment system 310 is illustrated with enrollment processing module 340. The enrollment processing module may receive an indication that the user has accepted the subscription offer or has otherwise indicated a desire to become a subscriber and may initiate enrollment of the customer. For example, the enrollment processing module may communicate with the subscription logic 395 to initiate the enrollment process.

Subscription-based shipping program enrollment system 310 is illustrated with revised fulfillment instruction module 350. In embodiments, the revised fulfillment instruction module 350 may receive instruction from one of the modules (e.g., the enrollment processing module 340) to determine whether a newly-subscribed customer has any existing orders and may determine a revised fulfillment plan for the existing order. In other embodiments, the revised fulfillment instruction module 350 may interact with the fulfillment management system 390 to determine the revised or modified or new fulfillment plan. The revised fulfillment instruction module 350 may instruct the revised or modified plan to be executed, in embodiments.

Figure 4:
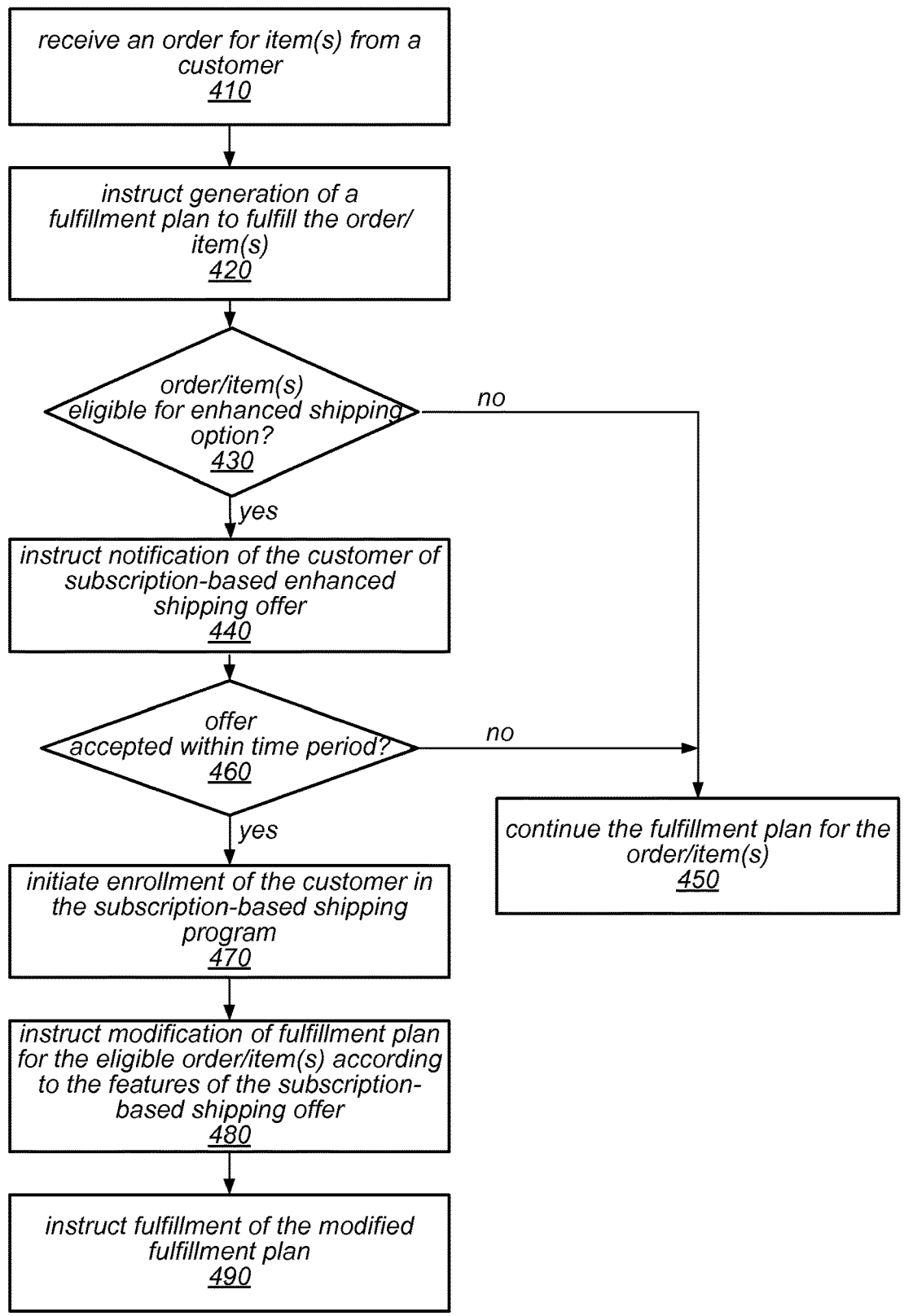
FIG. 4 is a flow diagram of a process for identifying an existing order of a non-subscriber that is eligible for subscription-based shipping program features, enrolling the non-subscriber, and modifying the fulfillment of the existing order based on the enrollment, according to some embodiments.

FIG. 4 is a flow diagram of a process for identifying existing orders of non-subscribers that are eligible for subscription-based shipping program features, enrolling the non-subscriber and instructing modification of the fulfillment of the existing order based on the enrollment, according to some embodiments. The illustrated process, described below, may be performed by one or more of the elements illustrated in FIGS. 2 and 3, in embodiments. The flow diagram refers to order and may be applied to orders only, multiple items, or single items, in embodiments.

An order for items is received from a customer (block 410). For example a network-based site (e.g., 385) may receive an order from a customer (e.g., one of customer(s) 250). Generation of a fulfillment plan to fulfill the order may be instructed (block 420). A fulfillment network management system 390 may generate the plan, for example, by interacting with shipping system 360 (e.g., to determine what transportation is possible), inventory system 370 (e.g., to determine where units of the ordered items are located) and the network-based site 385 (e.g., to receive the order). In embodiments, because the customer is not a subscriber, the customer is not provided with the option to select an enhanced shipping option. For example, user interface elements offering enhanced shipping may be hidden from non-subscribers as they interact with the network-based site 385. Thus, the customer may only select non-subscription-based shipping options and an associated fulfillment plan will not have subscription-based features such as enhanced shipping, in embodiments.

In another embodiment, the user interface may appear substantially the same to subscribers and non-subscribers. However, user interface elements that the customer interacts with may respond differently to subscribers then non-subscribers. For example, a user interface element that subscribers use to select subscription-based shipping may respond to a non-subscribers selection by making an offer to the customer to become a subscriber.

In embodiments, items that have been ordered, but associated with slower-speed, economy fulfillment procedures may be associated with a lag time before they are selected for fulfillment. For example, economy fulfillment procedures may dictate that items are not picked until several of the same items from the same area are needed or based on when there is more labor available to perform the picking. In some embodiments, items associated with economy shipping are allowed to sit in inventory for some period of time such that a subsequent order with eligibility for the same item may be fulfilled more quickly using the item that was allowed to sit in inventory. In some embodiments, enhanced shipping may be determined for an item based on whether a unit of the item can be selected for pick ahead of other items.

A determination is made whether the order is eligible for an enhanced shipping option (block 430). For example, eligibility determination module 320 performs the determination, based on interactions with any of the various elements illustrated in FIG. 3. The determination may be based upon any number of various factors including whether the customer is a subscriber, fulfillment-related constraints, cost-benefit analysis, or timing, for example. The determination may include analysis of multiple various fulfillment plans as possibilities. The various different plans may each be associated with different possible fulfillment times and/or windows and thus, may be associated with different amounts of time that the associated offer may be good for, in embodiments.

If the orders(s) are not eligible, the fulfillment plan for the orders may continue. If the order is eligible, notification of the customer of the subscription-based enhanced shipping offer is instructed (block 440). In embodiments, the notification module receives an indication that the order are eligible and instructs the notification, for example, instructing the network-based site to deliver a message to the customer as the customer is browsing the network-based site or via SMS messaging, etc. The notification may be time restricted (e.g., acceptance must be within a time period where the accelerated shipping is still possible), in embodiments.

A determination may be made whether the offer has been accepted within the time period (block 460). If the offer is not accepted within the time period, the fulfillment plan may continue (block 450). If the offer is accepted, enrollment of the customer in the subscription-bases shipping program may be initiated (block 470). For instance, the enrollment processing module 340 may receive an indication of acceptance of the offer via the network-based site 385 and may initiate enrollment via the subscription logic 395.

Modification of the fulfillment plan may be instructed for the eligible order according to the features of the subscription-based shipping offer (block 480). For example, revised fulfillment instruction module 350 may receive an indication from the enrolment processing module that the customer is subscribing and may interact with the fulfillment network management system 390 to modify the fulfillment plan or to select one of the particular alternative fulfillment plans determined during the eligibility determination 430, described above.

Modification or re-planning of the fulfillment plan may involve any of numerous operations. For example, items that have not yet left a fulfillment center or are still in the fulfillment network may be rescheduled for picking, packing, and shipping. In another example, for an item that is in the fulfillment network but delivery cannot be adjusted (e.g., the item is on a long-haul truck where the item cannot be pulled and/or changed until after the delivery promise) the item may be marked for cancellation and another sub-order may be placed for the same or similar item (e.g., same UPC code in the same condition) that is eligible. In some embodiments, items may be excluded from such treatment (e.g., items that are fast moving but with shallow inventory) to avoid stockout for other customers.

In another example, if an item is already in the shipping carrier network, a request may be made to upgrade the delivery service that will achieve the desired delivery date (e.g., upgrade an in-transit ground shipment to air when it reaches a distribution center).

Fulfillment of the modified fulfillment plan may be instructed (block 490). For instance, the revised fulfillment instruction module may instruct the modified fulfillment by interacting with the fulfillment network management system 390, inventory system 370, order workflow system 380 and/or shipping system 360.

Figure 5:
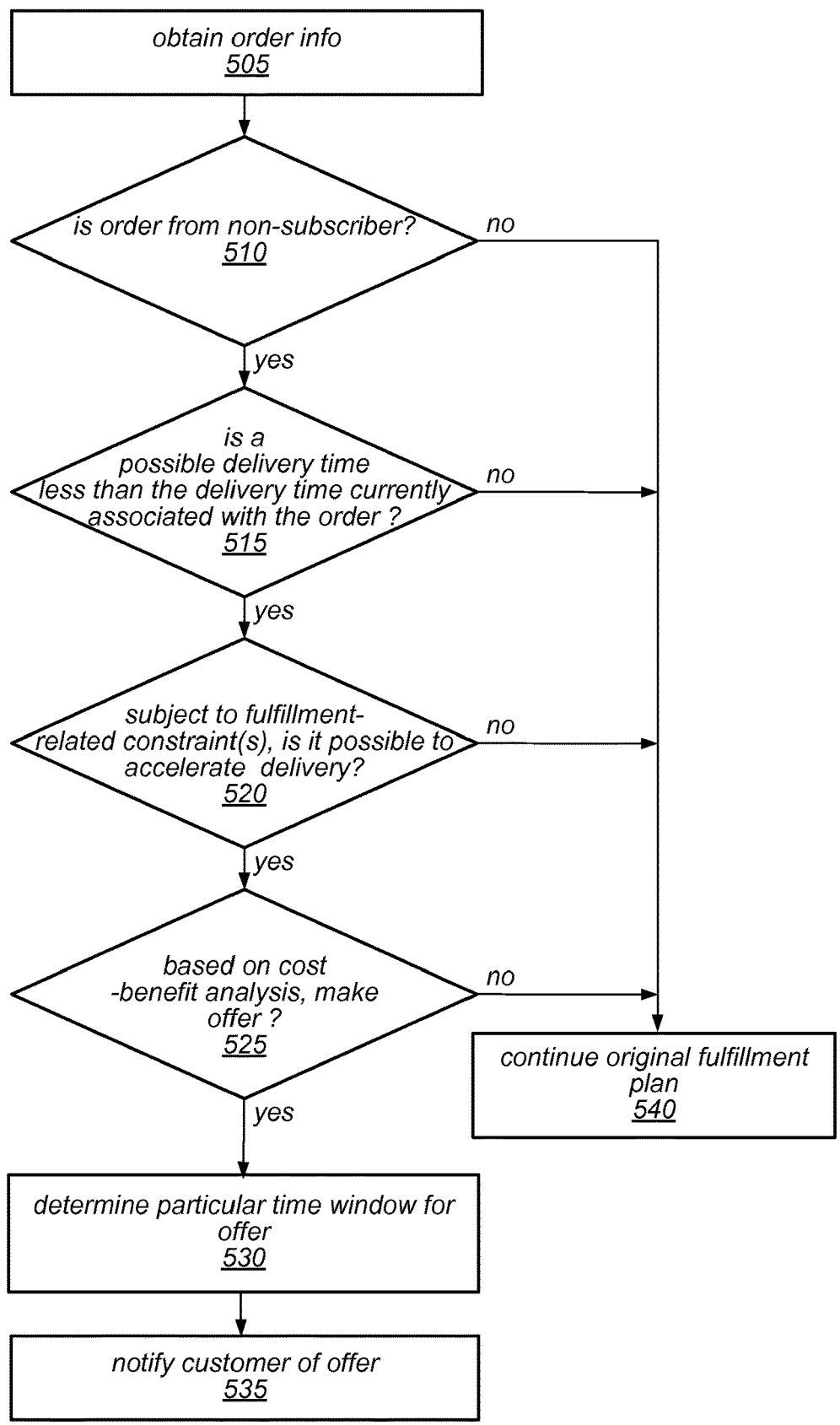
FIG. 5 is a flow diagram of a process for determining eligibility of an item for subscription-based shipping, according to some embodiments.

FIG. 5 is a flow diagram of a process for determining eligibility of an item for subscription-based shipping, according to some embodiments. In some embodiments, the process illustrated may be performed by one or more of the elements illustrated in FIGS. 2 and 3. In some embodiments, blocks 515-525 provide more detail of the eligibility determination block 430.

As illustrated, order information is obtained (block 505). The order information may be obtained by subscription-based shipping program enrollment system 310 from network-based site 385, in embodiments. A determination is made whether the order is from a non-subscriber (block 510). In embodiments, the subscription logic 395 is queried to determine whether the order is from a non-subscriber. In other embodiments the order information itself may indicated whether the order is from a non-subscriber, in FIG. 4.

A determination is made whether a possible delivery time is less than the delivery time currently associated with the order (block 515). For example, in some embodiments, a determination is made whether the shipping time selected by the customer is greater than the advertised subscription shipping time. In embodiments, the system determines whether it is possible to fulfill and/or deliver the order sooner than the delivery time currently associated with the order (e.g., the shipping/delivery time associated with the basic shipping plan or the time associated with the fulfillment plan selected by the customer at the time of the order). In embodiments, at least one of the possible delivery times must be less than the current delivery time for the order to be eligible and/or for the customer to be notified of the offer. For instance, if the customer selected 7 day shipping, and the advertised subscription shipping (e.g., enhanced shipping) is 2 day, then the shipping time selected by the customer is greater than the advertised subscription shipping time. If all of the possible delivery times are greater than the delivery time currently associated with the order (e.g., if the order was placed with accelerated shipping), the process may continue with the original fulfillment plan (block 540).

A determination is made whether it is possible to accelerate delivery, subject to fulfillment-related constraint(s) (block 520). For example, the eligibility determination module 320 may make this determination based on information obtained from the fulfillment network management system 390. A non-exhaustive list of fulfillment-related constraints includes locations of units of items in fulfillment network(s), shipping options, common-carrier options, items characteristics such as size or a fragile nature, where the unit of the item is currently located in-flight and the like, although other constraints are contemplated as well.

A determination may be made whether to make the offer, based on a cost-benefit analysis (block 525). For example, the eligibility determination module 320 may make this determination based on information obtained from subscription logic 395, fulfillment network management system 390 and/or the network-based site. In some instances, one or some of the possible fulfillment plans identified by the fulfillment network management system 390 may be cost-prohibitive. For example, if a new subscriber is valued at $50/year and the cost of providing the enhanced shipping for the existing item is $200, the particular fulfillment plan may be judged too expensive and thus, not offered. In some embodiments, the cost-benefit analysis may use mitigation logic to make an offer. For example, if the cost of enhanced shipping is too much, the offer may be adjusted to reduce the shipping cost to the customer, or to provide the item in less days than the customer had originally selected, but in more days than the subscription-based shipping program normally advertises. Other types of cost-benefit analysis are contemplated without departing from the scope of this disclosure. In some embodiments, additional signal data may be used to determine eligibility. For example, customers in a particular region may be given a higher eligibility ranking than other customers, based on their region.

If any of the determinations 510-525 determine a negative outcome (no) then the original fulfillment plan may continue or be initiated (block 540). For example, the fulfillment network management system may continue instructing fulfillment of the existing order in accordance with the original fulfillment plan.

A particular time window for the order may be determined (block 530). For example, the eligibility determination module 320 may determine various time windows for each of the possible fulfillment plans determined via interaction with the fulfillment network management system 390 (e.g., during eligibility determination). In embodiments, if the customer does not accept the offer within a certain time window, delivery in accordance with enhanced shipping (e.g., accelerated delivery) may not be possible. The eligibility determination module 320 or the notification module 330 may select a particular one of the various time windows and instruct use of that time window as part of the notification provided to the customer (e.g., SMS 614 and website 616 notification in FIG. 6).

Various machine learning techniques or customer segment targeting techniques may be used for determining the particular time window. For example, if the transportation possibilities include 1-day air or 2-day ground, 1-day air may be selected for lighter items and 2-day ground may be selected for heavier items (e.g., based on cost analysis). In some embodiments, A-B testing may be performed to determine better performing incentives. For example, different offers (e.g., 2-day vs. 1-day) may be offered to different customers (e.g., different customers in similar circumstances may be offered different incentives) and the results of the various offers analyzed to determine which type of offers are more successful and/or effective (e.g., obtain more subscribers, cost less, etc.). In embodiments, additional signal data may be used to determine the particular time window (e.g., such as when other determinants cause time window options to be ranked similarly).

Figure 6:
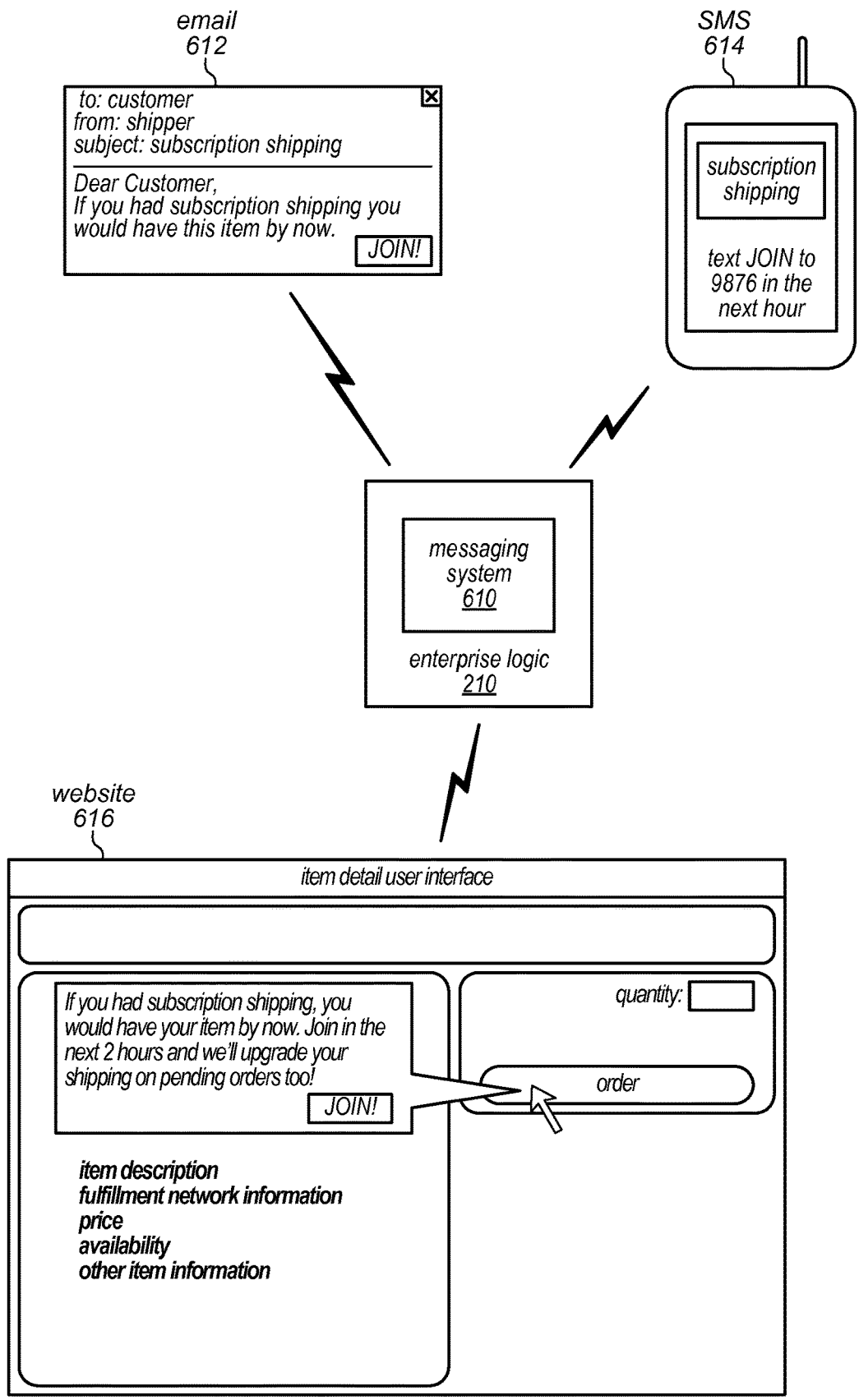
FIG. 6 illustrates multiple forms of notification that may be sent to a customer.

The customer is notified of the offer (block 535). For example, notification module 330 may instruct the network-based site to display the offer (e.g., FIG. 6, website 616) or may interact with a communication system such as a private SMS communication system to send an SMS message (e.g., FIG. 6, SMS 614) or an e-mail communications system (e.g., of the network-based site or otherwise) to send an e-mail to the customer (FIG. 6, email 612). In some embodiments, the notification module may send an in-app notification to an application other than the network-based site where the order was placed.

In embodiments, the notification module may send a notification instruction to a customer service system. The notification instruction may direct the customer service system to notify the customer of the subscription-based shipping offer, such as when the customer calls in for customer service for example, or as part of a message sent to the customer service portion of the network-based site, in another example.

FIG. 6 illustrates multiple forms of notification that may be sent to a customer and/or a potential customer (referred to herein interchangeably as "customer" for the sake of brevity). In some embodiments, the notifications may be instructed by the notification module 330 interacting with various elements of FIG. 3. In other embodiments, notification module 330 may interact with various outside systems via private or public network(s) (e.g., network 220) to instruct the notifications. In some embodiments, the enterprise system may include a messaging system (e.g., a proprietary messaging system) configured to act as an interface with customer via various communication channels. Messaging system 610 may be configured to store or obtain user-defined preferences for receiving communications (e.g., via SMS, e-mail, phone or mail) and to provide access to systems or services that provide customer contact via those channels. In some embodiments, notification module 330 may interact with messaging system 610 in order to instruct the notifications.

FIG. 6 illustrates email 612 that includes a message from the subscription-based shipping program enrollment system 310 notifying the customer of the features of the subscription-based shipping program. SMS 614 illustrates an SMS message from the subscription-based shipping program enrollment system 310 instructing the potential customer on how to enroll and when. Website 616 illustrates a user interface of a website (e.g., network-based site 385 with a message that pops up when the customer hovers over the order button. The message explains that if the customer had subscription shipping, the customer would have received the item by now and the customer can receive the item sooner by joining subscription-based shipping. In some embodiments, the message itself may provide selectable interface elements for the customer to response with.

Notifications may be sent to any of various types of devices, such as phones, tablets and via any of various communications channels such as e-mail, SMS, social networks and the like.

Figure 7:
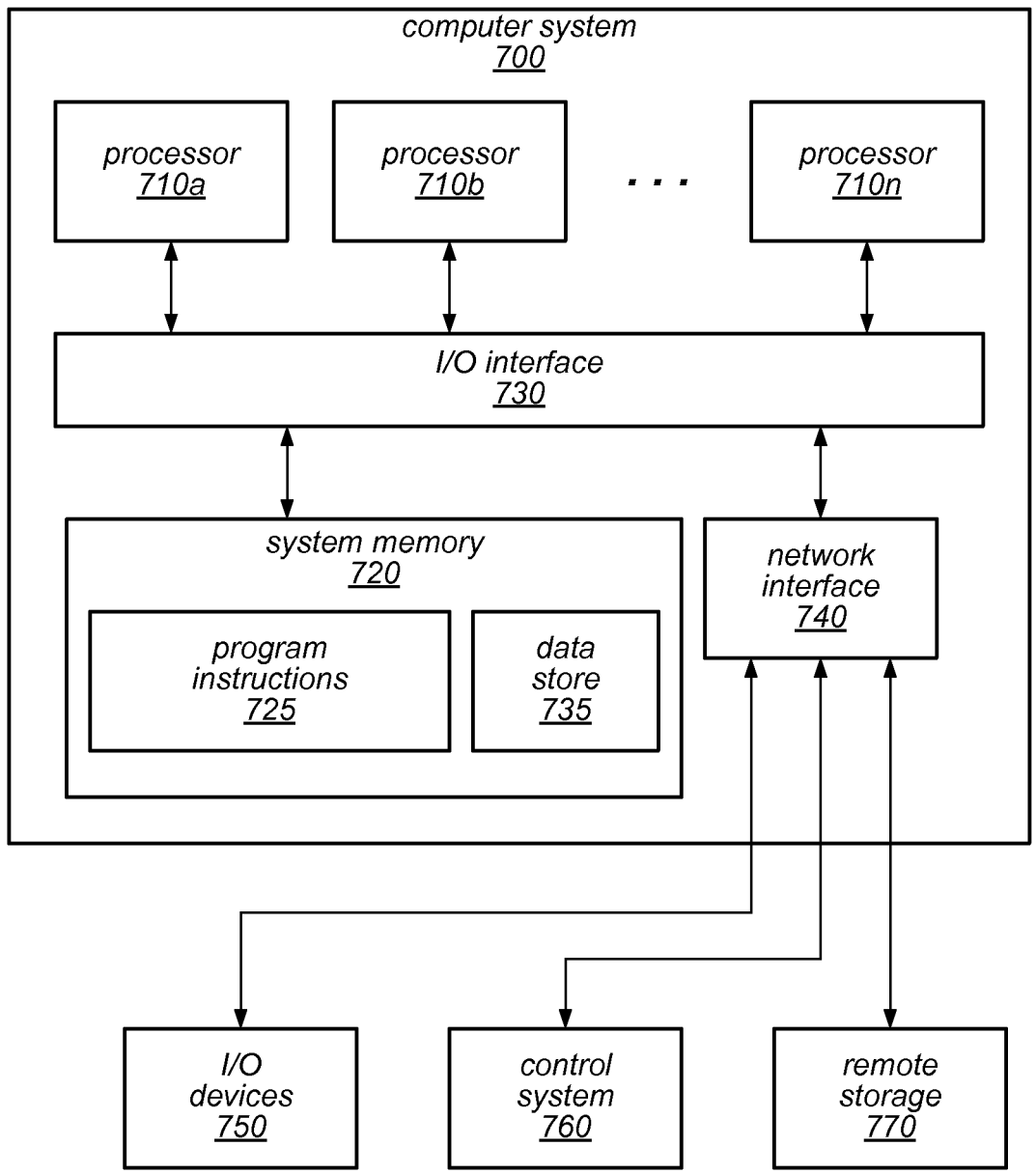
FIG. 7 is a block diagram illustrating an example computer system that implements some or all of the techniques described herein, according to different embodiments.

Any of various computer systems may be configured to implement a process for identifying existing orders of non-subscribers that are eligible for subscription-based shipping program features, enrolling the non-subscriber, and instructing modifying the fulfillment of the existing order based on the enrollment. For example, FIG. 7 is a block diagram illustrating one embodiment of a computer system suitable for implementing the system and methods described herein. In various embodiments, an enterprise system 210, fulfillment networks, shipping carriers or customer devices may each include a computer system such as computer system 700 illustrated in FIG. 7.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise system 210, while in other embodiments servers 290 may include more, fewer, or different elements than computer system 700. In some embodiments, computer system 700 may be illustrative of enterprise system 210, or a communication device (e.g., scanner) while in other embodiments a server implementing logic associated with the enterprise system, or a communication device may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile memory, a Flash-type memory, or any other type of memory. In the illustrated embodiment, program instructions and data implementing desired functions, such as those methods and techniques described above for the enterprise system, fulfillment networks, shipping carriers or customer devices, are shown stored within system memory 720 as program instructions 725. In some embodiments, system memory 720 may include data 727 (e.g., a product database) which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, for example. In particular, network interface 740 may be configured to allow communication between computer system 700 and/or various I/O devices 750. I/O devices 750 may include scanning devices, display devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g., SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to the agents, and devices integrated into or mounted on any mobile or fixed equipment of the materials handling facility such as pushcarts, bins, totes, racks, shelves, tables, ceilings, walls, and work benches, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with reactive transportation scheduling system 300. In general, an I/O device 750 (e.g., cursor control device 760, keyboard 770 or display(s) 780) may be any device that can communicate with elements of enterprise system 210 and convey instructions to agents within the facility. In one embodiment, at least some of the I/O devices 750 may be configured to scan or otherwise read or receive codes or identifiers of various components in the materials handling facility and to communicate the entered codes to enterprise system 210. Such components may include, but are not limited to, one or more of items, orders, packing stations, bins, and compartments of bins.

The various methods as depicted in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the enterprise system, product database, and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

The use of the terms "a," "an," "the," and similar references in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not imply that certain embodiments require at least one of X, at least one of Y, and/or at least one of Z in order for each to be present.

Illustrative embodiments of this disclosure are described herein, including the best mode known to the inventors for carrying out the disclosure. Variations of those embodiments may become apparent to those skilled in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
a data store configured to at least store data regarding a subscription-based shipping program; and
a computing device in communication with the data store, the computing device configured to execute computer-executable instructions to at least:
receive a plurality of orders from a plurality of customers, wherein the plurality of customers includes subscriber customers that are subscribers to the subscription-based shipping program and non-subscriber customers that are not subscribers to the subscription-based shipping program, wherein at least some orders of the plurality of orders received from subscriber customers are eligible for an enhanced fulfillment option;

for each order of the plurality of orders,
generate a fulfillment plan to fulfill the order taking into account eligibility of the order for the enhanced fulfillment option,
obtain a fulfillment status of the order, and
obtain transportation possibility information for the order;

identify an existing order of the plurality of orders from a non-subscribing customer that:
based at least in part on the fulfillment status, is not planned to be shipped according to the enhanced fulfillment option, and
based at least in part on the transportation possibility information, can be shipped according to the enhanced fulfillment option;

send a notification to the non-subscribing customer for the existing order indicating that the existing order can be shipped according to the enhanced fulfillment option if the non-subscribing customer enrolls in the subscription-based shipping program within a specified time period;

receive notification that the non-subscribing customer has enrolled in the subscription-based shipping program within the specified time period;

modify a fulfillment plan for the existing order to generate a modified fulfillment plan for fulfilling the existing order that takes into account the enhanced fulfillment option;

enroll the customer in the subscription-based shipping program; and expose one or more subscription-based shipping interface elements of a network-based site to the customer who has enrolled, wherein the one or more subscription-based shipping interface elements are hidden from non-subscribing customers, and wherein the one or more subscription-based shipping interface elements allow ordering with the enhanced fulfillment option.

2. The system of claim 1, wherein the enhanced fulfillment option includes accelerated delivery associated with a specified shipping timeframe, and wherein to identify the existing order, the computing device is further configured to execute the computer-executable instructions to at least determine that a remaining time of a shipping timeframe for the existing order is greater than the specified shipping timeframe associated with the enhanced fulfillment option.

3. The system of claim 2, wherein to identify the existing order, the computing device is further configured to execute the computer-executable instructions to at least determine, based at least in part on a cost-benefit analysis of fulfillment costs for fulfilling the existing order according to the enhanced fulfillment option and a benefit to an enterprise of enrollment of the non-subscribing customer in the subscription-based shipping program, to send the notification.

4. The system of claim 1, wherein the fulfillment plan is modified while the existing order is in progress for fulfillment, and wherein to modify the fulfillment plan, the computing device is further configured to execute the computer-executable instructions to at least instruct redirection of the existing order from a fulfillment route specified by the fulfillment plan to a fulfillment route specified by the modified fulfillment plan such that the existing order is delivered according to the modified fulfillment plan instead of the fulfillment plan.

5. The system of claim 1, wherein the computing device is further configured to execute the computer-executable instructions to at least:
in response to the notification that the non-subscribing customer has enrolled, identify other existing orders for the customer;
identify which of the identified other existing orders are eligible for the enhanced fulfillment option; and
modify the fulfillment plan for each of the other existing orders that are eligible for the enhanced fulfillment option.

6. A computer-implemented method comprising:
performing by one or more computers executing specific computer-executable instructions,
for an existing order from a customer that is not a subscriber to a subscription-based shipping program, determining that the existing order is an eligible order for the subscription-based shipping program based at least in part on:
the existing order not currently being planned to be shipped according to an enhanced fulfillment option available to subscribers of the subscription-based shipping program, and
the existing order currently being convertible to be shipped according to the enhanced fulfillment option;

in response to determining that the existing order is an eligible order, sending a notification to the customer indicating that the eligible order can be shipped according to the enhanced fulfillment option conditioned on enrollment by the customer in the subscription-based shipping program within a specified time period;

receiving an indication that the customer has requested enrollment in the subscription-based shipping program within the specified time period;

initiating enrollment of the customer in the subscription-based shipping program;

instructing modification of a fulfillment plan for the existing order to fulfill the existing order according to the enhanced fulfillment option;

enrolling the customer in the subscription-based shipping program; and exposing one or more subscription-based shipping interface elements of a network-based site to the customer who has enrolled, wherein the one or more subscription-based shipping interface elements are hidden from non-subscribing customers, and wherein the one or more subscription-based shipping interface elements allow ordering with the enhanced fulfillment option.

7. The computer-implemented method of claim 6, wherein the enhanced fulfillment option includes accelerated delivery associated with a specified shipping timeframe, wherein determining that the existing order is an eligible order comprises determining that a remaining time of a shipping timeframe for the existing order is greater than the specified shipping timeframe associated with the enhanced fulfillment option.

8. The computer-implemented method of claim 6, wherein the enhanced fulfillment option comprises at least one of earlier access to an item of the order or access to another version of the item of the order.

9. The computer-implemented method of claim 6, wherein sending the notification to the customer comprises sending the notification to the customer via phone, text message, e-mail, or a message window of a network-based site configured to receive orders from customers, wherein the existing order was placed via the network-based site.

10. The computer-implemented method of claim 6, wherein the modification of the fulfillment plan provides for accelerated shipping in route of an item of the existing order that has been already been packed and shipped.

11. The computer-implemented method of claim 6, further comprising:
following receiving the indication that the non-subscribing customer has requested enrollment,
identifying other existing orders for the customer;
determining which of the other existing orders are eligible for the enhanced fulfillment option; and
instructing modification of the fulfillment plan for each of the other existing orders that are eligible for the enhanced fulfillment option.

12. The computer-implemented method of claim 6, further comprising determining whether to send the notification based at least in part on a cost-benefit analysis of a fulfillment cost of fulfilling the eligible order according to the enhanced fulfillment option and a benefit to an enterprise of enrollment of the non-subscribing customer in the subscription-based shipping program.

13. A non-transitory computer-readable storage medium storing program instructions that when executed on one or more computers cause the one or more computers to perform:
receiving an indication of an order from a customer for one or more items, wherein the customer is not enrolled in a subscription-based shipping program;
determining that at least one item of the one or more items of the order is eligible for subscription-based shipping according to the subscription-based shipping program; and
subsequent to said determining,
sending to the customer a notification of an offer for subscription-based shipping for the at least one item according to the subscription-based program;
receiving an indication that the customer has requested to enroll in the subscription-based shipping program;
generating a modified fulfillment plan for the at least one item based at least in part on the subscription-based shipping program;
instructing execution of the modified fulfillment plan for the at least one item;
enrolling the customer in the subscription-based shipping program; and
exposing one or more subscription-based shipping interface elements of a network-based site to the customer who has enrolled, wherein the one or more subscription-based shipping interface elements are hidden from non-subscribing customers, and wherein the one or more subscription-based shipping interface elements corresponds to ordering with subscription-based shipping.

14. The non-transitory computer-readable storage medium of claim 13, wherein the program instructions further cause the one or more computers to perform:
prior to said sending the notification to the customer of the offer for subscription-based shipping,
determining whether to send the notification of the offer for subscription-based shipping based at least in part on a cost-benefit analysis of one or more fulfillment costs of fulfilling the eligible order according to one or more possible fulfillment plans and a benefit to an enterprise of enrollment of the non-subscribing customer in the subscription-based shipping program.

15. The non-transitory computer-readable storage medium of claim 13, wherein the program instructions further cause the one or more computers to perform:
specifying, as part of the notification to the customer, a time period that limits when the customer may receive subscription-based shipping according to the subscription-based shipping program for the one or more items, wherein subscription-based shipping will not be provided for the one or more items if the customer enrolls after the time period.

16. The non-transitory computer-readable storage medium of claim 13, where sending to the customer the notification of the offer for subscription-based shipping comprises sending the notification via phone call, via text message, via e-mail or via a message window of a network-based site configured to receive orders from customers.

17. The non-transitory computer-readable storage medium of claim 13, wherein the program instructions further cause the one or more computers to perform:
prior to said sending the notification to the customer of the offer for subscription-based shipping,
providing the customer, in response to selection of a subscription-based shipping interface element by the customer, an offer to enroll the customer in the subscription-based shipping program;
subsequent to said receiving an indication that the customer has requested to enroll in the subscription-based shipping program,
initiating enrollment of the customer in the subscription-based shipping program; and
subsequent to the enrollment of the customer,
providing the customer, in response to selection of the same subscription-based shipping interface element by the customer, a feature of the subscription-based shipping program.

18. The non-transitory computer-readable storage medium of claim 13, wherein the modified fulfillment plan provides for accelerated shipping for the at least one item that reduces an amount of time required for fulfilling the at least one item.

19. The non-transitory computer-readable storage medium of claim 13, wherein execution of the modified fulfillment plan for the at least one item causes the at least one item to be redirected in-flight.

20. The non-transitory computer-readable storage medium of claim 13, wherein said generating the modified fulfillment plan for the at least one item comprises generating a modified fulfillment plan that provides for at least one of earlier access to an item of the order or delivery of another version of the item of the order.

* * * * *